(12) United States Patent
Okuda

(10) Patent No.: US 9,430,018 B2
(45) Date of Patent: Aug. 30, 2016

(54) ENERGY-SAVING CONTROL METHOD INVOLVING AN ENERGY-SAVING MODE

(71) Applicant: KYOCERA Document Solutions Inc., Osaka (JP)

(72) Inventor: Masaya Okuda, Osaka (JP)

(73) Assignee: KYOCERA Document Solutions Inc. (JP)

( * ) Notice: Subject to any disclaimer, the term of this patent is extended or adjusted under 35 U.S.C. 154(b) by 464 days.

(21) Appl. No.: 13/973,465

(22) Filed: Aug. 22, 2013

(65) Prior Publication Data
US 2014/0067087 A1 Mar. 6, 2014

(30) Foreign Application Priority Data
Aug. 29, 2012 (JP) .................... 2012-189255

(51) Int. Cl.
*G06F 1/32* (2006.01)
*G06F 1/26* (2006.01)
*H04N 1/00* (2006.01)

(52) U.S. Cl.
CPC .............. *G06F 1/3206* (2013.01); *G06F 1/26* (2013.01); *G06F 1/3209* (2013.01); *G06F 1/3284* (2013.01); *H04N 1/00891* (2013.01); *H04N 1/00896* (2013.01); *H04N 1/00904* (2013.01); *Y02B 60/1267* (2013.01)

(58) Field of Classification Search
CPC ...... G06F 1/26; G06F 1/3203; G06F 1/3206; G06F 1/3284; H04N 1/00885; H04N 1/00891; H04N 1/00896; H04N 1/00904; G03G 15/5004; Y02B 60/1267
See application file for complete search history.

(56) References Cited

U.S. PATENT DOCUMENTS 5,457,516 A * 10/1995 Kim .................... G03G 15/2003
399/37
7,302,195 B2 * 11/2007 Kobayashi ............ G06F 1/3203
399/8

FOREIGN PATENT DOCUMENTS

| JP | 11-252289 | | 9/1999 |
|----|-----------|---|--------|
| JP | 2002-084380 | A | 3/2002 |
| JP | 2003-219077 | A | 7/2003 |
| JP | 2004005029 | A * | 1/2004 |
| JP | 2004-222234 | | 8/2004 |
| JP | 2011-029745 | A | 2/2011 |
| JP | 2011-101330 | A | 5/2011 |
| JP | 2013206058 | A * | 10/2013 |

* cited by examiner

*Primary Examiner* — Crystal J Barnes-Bullock
(74) *Attorney, Agent, or Firm* — McDonnell Boehnen Hulbert & Berghoff LLP

(57) ABSTRACT

An electronic apparatus includes: a plurality of operation input units configured to receive an operation input and enable operations by processing based on different functions; an operating unit group configured to perform the processing based on the different functions by at least one of operating units operating after the operation input; and an energy-saving control unit configured to perform energy-saving control for shifting one or more of the operating units to an energy-saving mode and reactivating one or more of the operating units from the energy-saving mode, and reactivate one or more of the operating units necessary for the operation after the operation input when the operation input during the energy-saving mode is common to a plurality of functions.

6 Claims, 5 Drawing Sheets

| TRIGGER OPERATION | REACTIVATION OF SCANNER | REACTIVATION OF ENGINE |
|---|---|---|
| LOADING ORIGINAL DOCUMENT INTO ORIGINAL FEEDER | NECESSARY | UNNECESSARY |
| OPENING/CLOSING OF ORIGINAL COVER | NECESSARY | UNNECESSARY |
| INSERTION OF COIN | NECESSARY | NECESSARY |
| TOUCHING OF CARD | UNNECESSARY | UNNECESSARY |
| PRINT BY PRINTER | UNNECESSARY | NECESSARY |
| TWAIN/WIA | NECESSARY | UNNECESSARY |
| WSD SCAN | NECESSARY | UNNECESSARY |
| WSD PRINT | UNNECESSARY | NECESSARY |
| NETWORK FAX TRANSMISSION | UNNECESSARY | UNNECESSARY |

FIG. 3

ENERGY-SAVING CONTROL METHOD INVOLVING AN ENERGY-SAVING MODE

REFERENCE TO RELATED APPLICATIONS

This application is based upon and claims the benefit of priority from the corresponding Japanese Patent Application No. 2012-189255, filed in the Japan Patent Office on Aug. 29, 2012, the entire contents of which are incorporated herein by reference.

BACKGROUND

I. Technical Field

Unless otherwise indicated herein, the description in this background section is not prior art to the claims in this application and is not admitted to be prior art by inclusion in this section. The present disclosure relates to an energy-saving control method for an electronic apparatus.

II. Description of the Related Art

An electronic apparatus such as a typical image forming apparatus can be provided with an energy-saving mode (power-saving mode). In the energy-saving mode, excess power consumption can be suppressed by, for example, interrupting the supply of power to operating units such as a scanner and a print engine.

When an original document is loaded into an original feeder in a typical image forming apparatus, for example, all operating units are reactivated to thereby enable a processing operation.

According to this technology, it is possible to reactivate the operating unit only by loading an original document into the original feeder.

However, the typical image forming apparatus has various functions such as a copy function, a scan function, and a print function. It is not always necessary to reactivate all the operating units depending on the functions for the image forming apparatus.

Therefore, in a typical forming apparatus, it is possible that an unnecessary operating unit may be reactivated, which limits potential power savings.

In contrast, for example, there is a technology for prompting a user to select a button from a set of buttons provided for each function and reactivating only the operating unit necessary for the selected function from the energy-saving mode.

According to this technology, only the operating unit necessary for a function is reactivated, and hence it is possible to improve an effect in suppressing the power consumption.

However, reactivation from the energy-saving mode is performed only when any one of the buttons provided for each function is selected.

SUMMARY

An electronic apparatus according to one embodiment of the present disclosure includes a plurality of operation input units, an operating unit group, and an energy-saving control unit. The plurality of operation input units are configured to receive an operation input and enable operations by processing based on different functions. The operating unit group is configured to perform the processing based on the different functions by at least one of operating units operating after the operation input. The energy-saving control unit is configured to perform energy-saving control for shifting one or more of the operating units to an energy-saving mode and reactivating one or more of the operating units from the energy-saving mode, and as a partial reactivation mode, reactivate one or more of the operating units necessary for the operation after the operation input when the operation input during the energy-saving mode is common to a plurality of functions.

A non-transitory computer-readable recording medium according to one embodiment of the present disclosure stores an energy-saving control program executable by a computer of an electronic apparatus. The energy-saving control program includes first to third program codes. The first program code causes the computer to receive an operation input from a plurality of operation input units and enable operations by processing based on different functions. The second program code causes the computer to perform the processing based on the different functions by at least one of operating units operating after the operation input. The third program code causes the computer to perform energy-saving control for shifting one or more of the operating units to an energy-saving mode and reactivating one or more of the operating units from the energy-saving mode, and as a partial reactivation mode, reactivate only one or more of the operating units necessary for the operation after the operation input when the operation input during the energy-saving mode is common to a plurality of functions.

An energy-saving control method according to one embodiment of the present disclosure is performed on an electronic apparatus. A plurality of operation input units receives an operation input and enables operations by processing based on different functions. An operating unit group performs the processing based on the different functions by at least one of operating units operating after the operation input. An energy-saving control unit performs energy-saving control for shifting one or more of the operating units to an energy-saving mode and reactivating one or more of the operating units from the energy-saving mode, and as a partial reactivation mode, reactivating one or more of the operating units necessary for the operation after the operation input when the operation input during the energy-saving mode is common to a plurality of functions.

Additional features and advantages are described herein, and will be apparent from the following detailed description and the figures.

BRIEF DESCRIPTION OF THE DRAWINGS

In the accompanying drawings:

FIG. 3 illustrates correlations between trigger operations and the necessity to reactivate operating units according to the first embodiment of the present disclosure;

DETAILED DESCRIPTION

I. First Embodiment

Figure 1:
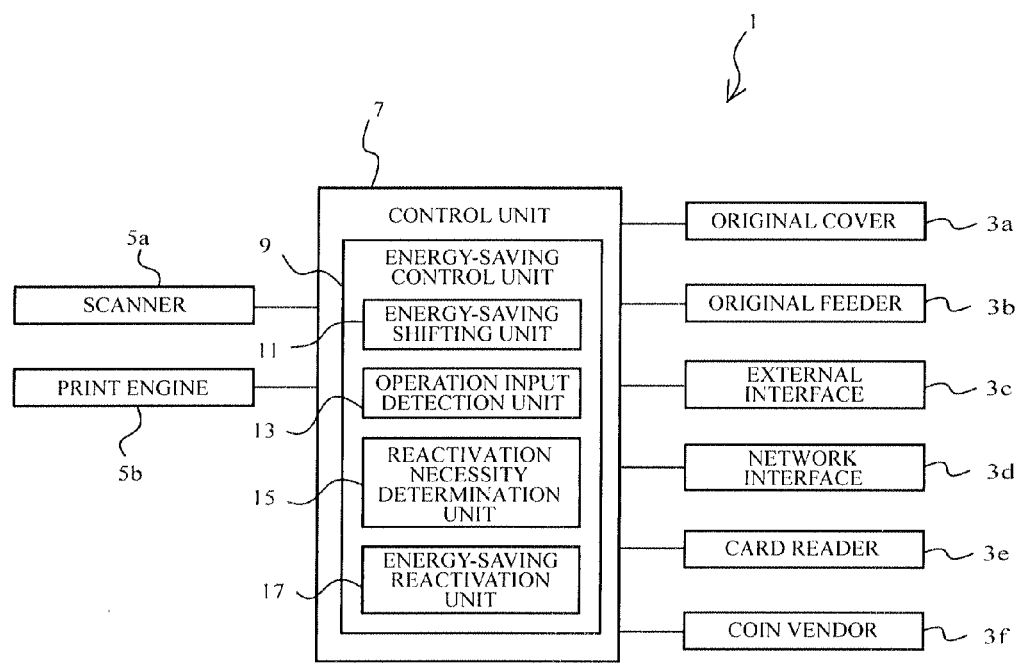
FIG. 1 illustrates a configuration of an electronic apparatus according to a first embodiment of the present disclosure.

FIG. 1 illustrates a configuration of an electronic apparatus according to a first embodiment of the present disclosure.

An image forming apparatus 1 illustrated in FIG. 1 is an example of the electronic apparatus according to the first embodiment of the present disclosure. The image forming apparatus 1 can be, for example, a digital multifunction peripheral including the energy-saving mode (power-saving mode), and has a plurality of different functions such as a copy function (copying function), a scan function (scanning function), a print function (printing function), and a FAX function.

The image forming apparatus 1 includes a plurality of operation input units such as an original cover 3a, an original feeder 3b, an external interface 3c, a network interface 3d, a card reader 3e, and a coin vendor 3f. The plurality of operation input units receive a selected operation input made by the user, and enable operations based on the different functions. Note that, the original feeder 3b, the original cover 3a, the external interface 3c, the network interface 3d, the card reader 3e, and the coin vendor 3f are referred to also as "operation input units 3a to 3f".

The original cover 3a can be opened and closed on an original table, and holds down an original of a document or the like for reading thereof. The original feeder 3b feeds a plurality of original document pages one by one for reading thereof.

The external interface 3c includes a USB or the like that allows connection to an external apparatus, and allows transmission of data to and receiving of data from the connected external apparatus. The network interface 3d allows connection to the external apparatus via a network, and allows transmission of data thereto and receiving of data therefrom.

In the first embodiment, a print instruction, a scan instruction, a FAX transmission instruction, and the like are performed via the external interface 3c or the network interface 3d.

The card reader 3e reads a card (e.g. an IC card), and allows the user to input his/her authentication information. The coin vendor 3f allows a coin to be inserted in order to enable use of the image forming apparatus 1, and is installed in a shop or the like that charges on the use of the image forming apparatus 1.

The image forming apparatus 1 according to the first embodiment includes a scanner 5a and a print engine 5b as a plurality of operating units in order to perform processing operations based on different functions. Note that, the scanner 5a is also referred to as "operating unit 5a," and the print engine 5b is also referred to as "operating unit 5b." Together, they may also be referred to "operating units 5a and 5b.", respectively.

The scanner 5a reads the original that is held down by the original cover 3a or fed from the original feeder 3b, and generates image data thereon. The scanner 5a is used for the copy function, the scan function, the FAX function, and the like.

The print engine 5b forms an image on paper based on the image data generated by the scanner 5a or image data input via the external interface 3c or the network interface 3d. The print engine 5b is used for the copy function, the print function, the FAX function, and the like.

The image forming apparatus 1 having the above-mentioned configuration causes a control unit 7 to control the respective units. The control unit 7 is a computer having an information processing function, and includes a central processing unit (CPU), a read only memory (ROM), and a random access memory (RAM).

The CPU is a control element (processor) that executes a program to perform control and work of the respective units described above. The ROM is a memory that stores the program and the like. The RAM is a memory that temporarily stores the program and various kinds of data when the program is executed, and is used as a work area or the like.

The control unit 7 executes an energy-saving control program, to thereby function as an energy-saving control unit 9. The energy-saving control unit 9 realizes an energy-saving control procedure, and includes an energy-saving shifting unit 11, an operation input detection unit 13, a reactivation necessity determination unit 15, and an energy-saving reactivation unit 17.

The energy-saving shifting unit 11 shifts at least one of the operating units 5a and 5b to the energy-saving mode by interrupting the supply of power thereto if the image forming apparatus 1 does not operate for a specific time period or other such case.

The operation input detection unit 13 detects the operation input performed through the operation input units 3a to 3f by the user during the energy-saving mode, as a trigger operation for reactivation from the energy-saving mode.

The reactivation necessity determination unit 15 determines the necessity to reactivate the operating units, such as 5a and 5b, from the energy-saving mode based on the trigger operation. In this determination of necessity, in a case where the trigger operation during the energy-saving mode is common to a plurality of functions, it is determined that the reactivation is necessary for at least one of the operating units such as 5a and 5b necessary for the operation subsequent to the trigger operation.

Further, when it becomes clear that the trigger operation during the energy-saving mode corresponds to the specific function, it is determined that the reactivation is necessary for at least one of the operating units 5a and 5b necessary for the specific function.

The energy-saving reactivation unit 17 reactivates at least one of the operating units 5a and 5b, for which it has been determined that the reactivation is necessary, from the energy-saving mode by supplying power.

Figure 2:
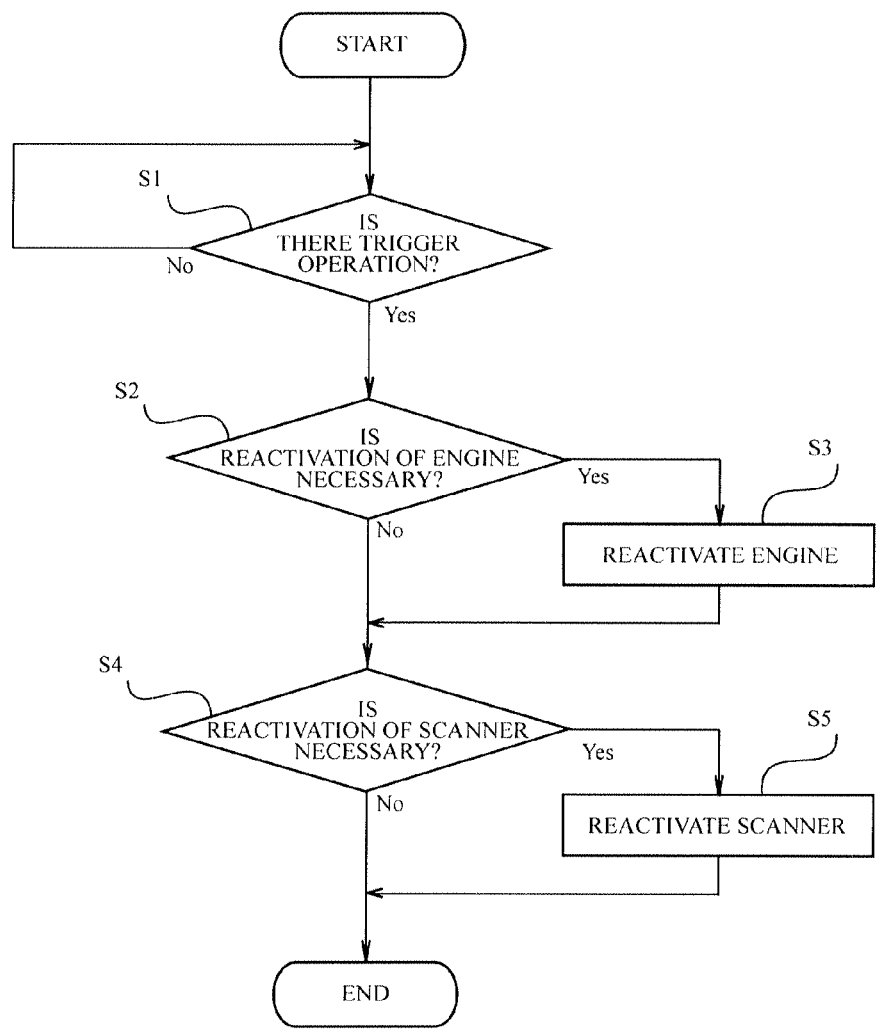
FIG. 2 illustrates energy-saving control processing according to the first embodiment of the present disclosure.

FIG. 2 illustrates energy-saving control processing according to the first embodiment. In the energy-saving control processing according to the first embodiment, the image forming apparatus 1 starts by shifting to the energy-saving mode. Then processing of step S1 and the subsequent steps of FIG. 2 is performed.

In step S1, the operation input detection unit 13 of the energy-saving control unit 9 determines whether the trigger operation occurs using the operation input units 3a to 3f.

In the first embodiment, the following are considered a trigger operation input: opening or closing the original cover 3a; loading an original document in the original feeder 3b; reading of a card performed by the card reader 3e; insertion of a coin into the coin vendor 3f; and the print instruction, the scan instruction, the FAX transmission instruction, or any other instruction provided by the external interface 3c or the network interface 3f. The trigger operation input is not limited to above list.

Note that the detection of the trigger operation input can be performed by receiving signals from sensors provided to the original cover 3a, the original feeder 3b, the card reader 3e, and the coin vendor 3f. The detection of the trigger operation input can also be performed by receiving data via the external interface 3c or the network interface 3d.

If there is a trigger operation, the procedure advances to step S2. If there is no trigger operation, the processing of step S1 is repeated.

In step S2 and the subsequent steps, while performing the determination of necessity for reactivation by applying the rules in the reactivation necessity table in FIG. 3, at least one of the operating units 5a and 5b that is necessary is reactivated.

FIG. 3 shows correlations between trigger operations and the necessity to reactivate the operating units 5a and 5b. Note that, the trigger operations of FIG. 3 are merely examples, and other operation inputs can be included in the trigger operations.

In FIG. 3, "LOADING ORIGINAL DOCUMENT INTO ORIGINAL FEEDER", "OPENING/CLOSING OF ORIGINAL COVER", "INSERTION of COIN", and "TOUCHING OF CARD" indicate the trigger operations performed commonly to a plurality of functions.

The "LOADING ORIGINAL DOCUMENT INTO ORIGINAL FEEDER" and the "OPENING/CLOSING OF ORIGINAL COVER" are the loading of an original document into the original feeder 3b and the opening or closing of the original cover 3a, respectively, and are trigger operations performed commonly for the copy function, the scan function, and the FAX function. With those trigger operations, a scan is performed as the subsequent operation. Accordingly, in the cases of the "LOADING ORIGINAL DOCUMENT INTO ORIGINAL FEEDER" and the "OPENING/CLOSING OF ORIGINAL COVER", as the necessity to reactivate the operating units 5a and 5b, reactivation of a scanner is set to "NECESSARY", and reactivation of an engine is set to "UNNECESSARY".

The "INSERTION OF COIN" and the "TOUCHING OF CARD" are the insertion of the coin into the coin vendor 3f and the reading of a card performed by the card reader 3e, respectively, and are trigger operations performed commonly to enable the use of the image forming apparatus 1. The operation that directly follows those trigger operations is unclear, but the necessity to reactivate the operating units 5a and 5b is set depending on purposes thereof.

In the case of the "INSERTION OF COIN", the copy function is often used in consideration of enabling the use of the image forming apparatus 1 in the shop or the like. Therefore, for the "INSERTION OF COIN", both the reactivation of the scanner and the reactivation of the engine are set to "NECESSARY".

In the case of the "TOUCHING OF CARD", use of the image forming apparatus 1 is often performed through authentication of the user. Therefore, for the "TOUCHING OF CARD", both the reactivation of the scanner and the reactivation of the engine are set to "UNNECESSARY".

In FIG. 3, "PRINT BY PRINTER", "TWAIN/WIA", "WSD SCAN", "WSD PRINT", and "NETWORK FAX TRANSMISSION" each indicate a trigger operation that clearly corresponds to a specific function.

The "PRINT BY PRINTER" is an input of the print instruction (print job) made from a user terminal (external apparatus), and is a trigger operation that clearly corresponds to the print function.

The "TWAIN/WIA" is an input of the scan instruction (scan job) made from a user terminal on which a TWAIN or WIA driver is installed, and is a trigger operation that clearly corresponds to the scan function.

The "WSD SCAN" is an input of the scan instruction (scan job) made from a user terminal on which an operating system (OS) that supports a WSDL function is installed. The "WSD PRINT" is an input of the print instruction (print job). Therefore, the "WSD SCAN" and the "WSD PRINT" are trigger operations that clearly correspond to the scan function and the print function, respectively.

The "NETWORK FAX TRANSMISSION" is an input of a network FAX transmission instruction (FAX job) made from a user terminal, and is a trigger operation that clearly corresponds to the FAX function.

For trigger operations such as "PRINT BY PRINTER", "TWAIN/WIA", "WSD SCAN", "WSD PRINT", and "NETWORK FAX TRANSMISSION", the necessity to reactivate the operating units 5a and 5b is depicted in FIG. 3 for the respective functions.

Note that, the selection of a function and the input of a job execution instruction on an operation panel (not shown) are also the trigger operations that clearly correspond to the specific function.

As illustrated FIG. 2, in step S2, the reactivation necessity determination unit 15 of the energy-saving control unit 9 refers to FIG. 3 to determine the necessity to reactivate the print engine 5b based on the trigger operation.

If the reactivation of the engine is necessary, the procedure advances to step S3. If the reactivation of the engine is unnecessary, the procedure advances to step S4.

In step S3, the energy-saving reactivation unit 17 of the energy-saving control unit 9 reactivates the print engine 5b by supplying power, and the procedure advances to step S4.

In step S4, the reactivation necessity determination unit 15 of the energy-saving control unit 9 determines the necessity to reactivate the scanner 5a based on the trigger operation.

If the reactivation of the scanner is necessary, the procedure advances to step S5. If the reactivation of the scanner is unnecessary, the energy-saving control processing is brought to an end.

In step S5, the energy-saving reactivation unit 17 of the energy-saving control unit 9 reactivates the scanner 5a by supplying power, and the energy-saving control processing is brought to an end.

The energy-saving control processing, thus brought to an end, is performed each time a trigger operation is input, and as long as each trigger operation is common to a plurality of functions, at least one of the operating units 5a and 5b necessary for the operation subsequent to the trigger operation is reactivated.

When it becomes clear that the trigger operation corresponds to the specific function, at least one of the operating units 5a and 5b necessary for the specific function is reactivated.

FIGS. 4A to 4D illustrate the reactivation of the operating units performed in the energy-saving control processing according to the first embodiment.

Figure 4A:
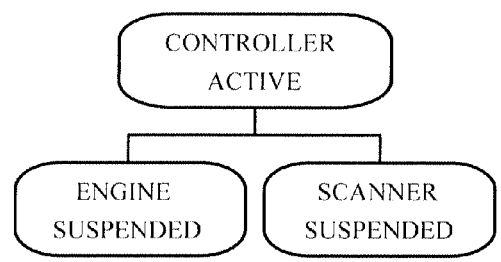
FIGS. 4A to 4D illustrate the reactivation of the operating units performed in the energy-saving control processing according to the first embodiment of the present disclosure.

In the energy-saving mode, as illustrated in FIG. 4A, the energy-saving control unit ("CONTROLLER") 9 is active, and the print engine ("ENGINE") 5b and the scanner ("SCANNER") 5a are suspended.

Figure 4B:
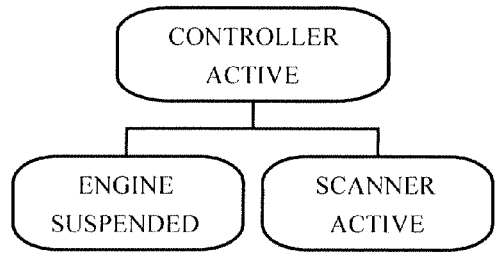

In this state, for example, when the "LOADING ORIGINAL DOCUMENT INTO ORIGINAL FEEDER" or the "OPENING/CLOSING OF ORIGINAL COVER" shown in FIG. 3 is performed, the scanner 5a necessary for the subsequent operation is reactivated to become active as illustrated in FIG. 4B.

Figure 4C:
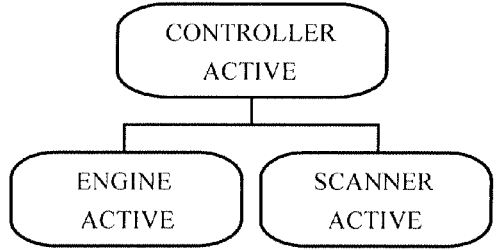

When a copy execution instruction is issued as the trigger operation through the operation panel after scanner 5a is reactivated, for example, a copy job occurs and it becomes clear that the trigger operation corresponds to the copy function. In this case, as illustrated in FIG. 4C, the print engine 5b necessary for the copy function is also reactivated to become active. Note that when a function is selected before an execution instruction is input, the function becomes clear at that point in time.

Figure 4D:
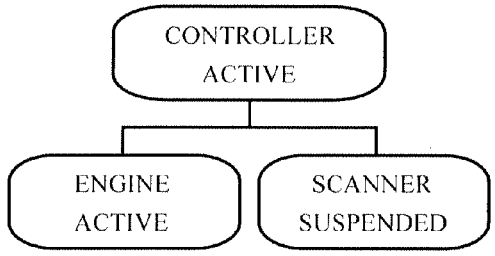

On the other hand, in the cases of the "Print by Printer" and the "WSD Print" that clearly correspond to the print function from the start, only the necessary print engine 5b is reactivated as illustrated in FIG. 4D.

Also in the cases of the "TWAIN/WIA" and the "WSD Scan", only the scanner 5a necessary for the scan function that is clear from the start is reactivated as illustrated in FIG. 4B.

The image forming apparatus 1 according to the first embodiment includes: the plurality of operation input units 3a to 3f that receive an operation input that is selected and enable an operation by processing based on different functions; the operating units 5a and 5b that perform the processing based on the different functions by at least one thereof operating after the operation input; and the energy-saving control unit 9 that performs energy-saving control for shifting the operating units 5a and 5b to an energy-saving mode and reactivating the operating units 5a and 5b from the energy-saving mode. The energy-saving control unit 9 has the partial reactivation mode for reactivating at least one of the operating units 5a and 5b necessary for the operation subsequent to the trigger operation in a case where the operation input (trigger operation) during the energy-saving mode is common to a plurality of functions, and reactivating at least one of the operating units 5a and 5b necessary for a specific function when it becomes clear that the trigger operation during the energy-saving mode corresponds to the specific function.

Accordingly, by reactivating at least one of the devices (operating units 5a and/or 5b) subsequent to the trigger operation when the trigger operation occurs, it is possible to improve the effect in suppressing the power consumption and to suppress noise while achieving the improvement in the convenience of the users.

Further, when a job occurs due to the trigger operation, it becomes clear that the trigger operation corresponds to the specific function at that point in time, and it is possible to determine the necessity to reactivate the operating units 5a and 5b.

Therefore, at least one of the operating units 5a and 5b necessary for the specific function can be reactivated to complete the processing normally. Note that the same applies to the case where it is clear that the trigger operation corresponds to the specific function from the start.

II. Second Embodiment

Figure 5:
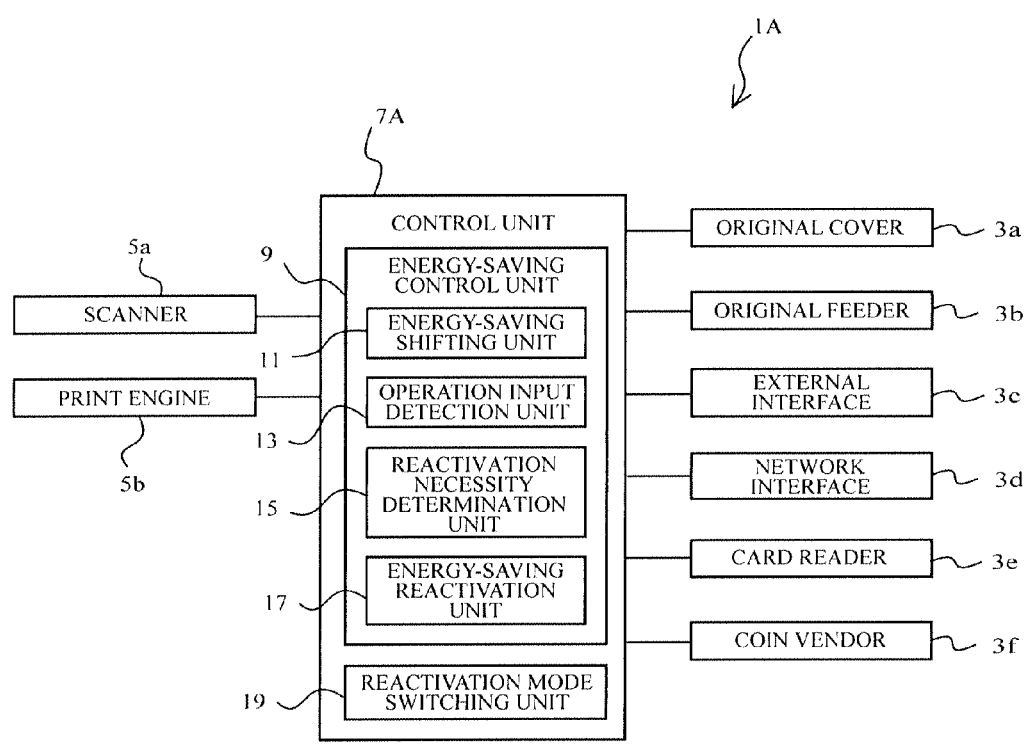
FIG. 5 illustrates a configuration of an electronic apparatus according to a second embodiment of the present disclosure.

FIG. 5 illustrates a configuration of an electronic apparatus according to a second embodiment of the present disclosure. Note that the electronic apparatus according to a second embodiment has a configuration similar to the first embodiment. Therefore the corresponding components are denoted by the same reference symbols or the same reference symbols with the suffix "A", to thereby omit duplicate descriptions.

An image forming apparatus 1A according to the second embodiment includes a reactivation mode switching unit 19 that switches an electronic apparatus such as a typical image forming apparatus among reactivation modes for reactivation from the energy-saving mode, the reactivation mode being set in the energy-saving control unit 9. The switching of the reactivation mode can be performed by the user who has logged in through the operation panel (not shown) or the like. This allows the reactivation mode switching unit 19 to realize a reactivation mode switching procedure.

The reactivation modes that can be set to a full reactivation mode, a combined reactivation mode, or a partial reactivation mode according to the first embodiment. The full reactivation mode is a mode for reactivating all the operating units 5a and 5b in response to any trigger operation. The combined reactivation mode is a mode for using the full reactivation mode and the partial reactivation mode together, and performing reactivation based on the full reactivation mode only in response to a specific operation other than the trigger operation. A power key operation or the like may be employed as a specific operation, for example.

In the case of the full reactivation mode, all the devices (operating units 5a and 5b) can be reactivated to be quickly used for copying and the like. In the second embodiment, by including the reactivation mode switching unit 19, it is possible to satisfy the demands of the user who wishes to give a high priority to reduction in reactivation time (user who wishes for the full reactivation mode), the user who wishes to give a high priority to power savings (user who wishes for the partial reactivation mode), and the user who wishes to use both appropriately.

The above-mentioned embodiments have been described by taking the scanner 5a and the print engine 5b that are large in the power consumption and noise as examples of the operating units, but other devices such as the operation panel and a FAX controller can also be assumed as the operating units to be subjected to the energy-saving control.

The energy-saving control method of the present disclosure may be applied to various kinds of electronic apparatuses with the energy-saving mode, in addition to image forming apparatuses.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:
1. An electronic apparatus, comprising:
a plurality of operation input units configured to receive an operation input and enable operations by processing based on different functions;
an operating unit group configured to perform the processing based on the different functions by one or more operating units operating after the operation input;
an energy-saving control unit configured to perform energy-saving control for shifting one or more of the operating units to an energy-saving mode and reactivating one or more of the operating units from the energy-saving mode, and as a partial reactivation mode, reactivate one or more of the operating units necessary for the operation after the operation input when the operation input during the energy-saving mode is common to a plurality of functions; and
a reactivation mode switching unit configured to switch to a reactivation mode for reactivation from the energy-saving mode, the reactivation mode being set in the energy-saving control unit,
wherein, in addition to the partial reactivation mode, the reactivation mode includes:
a full reactivation mode for reactivating all the operating units in response to any operation input; and
a combined reactivation mode for using the full reactivation mode and the partial reactivation mode together, and performing reactivation based on the full reactivation mode only in response to a specific operation other than the operation input.

2. The electronic apparatus according to claim 1, wherein the energy-saving control unit is configured to reactivate one or more of the operating units necessary for a specific function when it becomes clear that the operation input during the energy-saving mode corresponds to the specific function.

3. A non-transitory computer-readable recording medium storing an energy-saving control program executable by a computer in an electronic apparatus, the energy-saving control program comprising:
- a first program code for causing the computer to receive an operation input from a plurality of operation input units and enable operations by processing based on different functions;
- a second program code for causing the computer to perform the processing based on the different functions by at least one of operating units operating after the operation input;
- a third program code for causing the computer to perform energy-saving control for shifting one or more of the operating units to an energy-saving mode and reactivating one or more of the operating units from the energy-saving mode, and as a partial reactivation mode, reactivate one or more of the operating units necessary for the operation after the operation input when the operation input during the energy-saving mode is common to a plurality of functions; and
- a fourth program code for causing the computer to switch to a reactivation mode for reactivation from the energy-saving mode, the reactivation mode being set in the third program code for the energy-saving control,
- wherein, in addition to the partial reactivation mode, the reactivation mode includes:
  - a full reactivation mode for reactivating all the operating units in response to any operation input; and
  - a combined reactivation mode for using the full reactivation mode and the partial reactivation mode together, and performing reactivation based on the full reactivation mode only in response to a specific operation other than the operation input.

4. The non-transitory computer-readable recording medium according to claim 3, wherein the third program code causes the computer to reactivate one or more of the operating units necessary for a specific function when it becomes clear that the operation input during the energy-saving mode corresponds to the specific function.

5. An energy-saving control method, comprising:
- receiving, via a plurality of operation input units, an operation input and enabling operations by processing based on different functions;
- performing, via an operating unit group, the processing based on the different functions by at least one of operating units operating after the operation input;
- performing, via an energy-saving control unit, energy-saving control for shifting one or more of the operating units to an energy-saving mode and reactivating one or more of the operating units from the energy-saving mode, and as a partial reactivation mode, reactivating one or more of the operating units necessary for the operation after the operation input when the operation input during the energy-saving mode is common to a plurality of functions; and
- switching, via a reactivation mode switching unit, to a reactivation mode for reactivation from the energy-saving mode, the reactivation mode being set in the energy-saving control unit,
- wherein, in addition to the partial reactivation mode, the reactivation mode includes:
  - a full reactivation mode for reactivating all the operating units in response to any operation input; and
  - a combined reactivation mode for using the full reactivation mode and the partial reactivation mode together, and performing reactivation based on the full reactivation mode only in response to a specific operation other than the operation input.

6. The energy-saving control method according to claim 5, further comprising reactivating, via an energy-saving control unit, one or more of the operating units necessary for a specific function when it becomes clear that the operation input during the energy-saving mode corresponds to the specific function.

* * * * *